(12) United States Patent
Krauss

(10) Patent No.: US 10,353,797 B2
(45) Date of Patent: Jul. 16, 2019

(54) USING MEMORY TRACKING DATA TO INFORM A MEMORY MAP TOOL

(75) Inventor: Kirk J. Krauss, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1891 days.

(21) Appl. No.: 11/618,214

(22) Filed: Dec. 29, 2006

(65) Prior Publication Data

US 2008/0163176 A1    Jul. 3, 2008

(51) Int. Cl.
*G06F 11/36* (2006.01)
*G06F 11/34* (2006.01)

(52) U.S. Cl.
CPC ...... *G06F 11/3612* (2013.01); *G06F 11/3466* (2013.01); *G06F 11/3636* (2013.01); *G06F 2201/865* (2013.01)

(58) Field of Classification Search
CPC ............ G06F 11/3612; G06F 11/3466; G06F 11/3636; G06F 2201/865
USPC ....................................................... 717/124
See application file for complete search history.

(56) References Cited

U.S. PATENT DOCUMENTS

| | | | |
|---|---|---|---|
| 4,672,371 A | 6/1987 | Bugg | |
| 5,530,934 A * | 6/1996 | Hilton | ............................... 711/5 |
| 5,751,613 A | 5/1998 | Doty et al. | |
| 5,784,554 A * | 7/1998 | Hsiung | ............................ 714/45 |
| 5,860,161 A | 1/1999 | Hansen | |
| 5,864,342 A | 1/1999 | Kajiya et al. | |
| 6,026,230 A | 2/2000 | Lin et al. | |
| 6,349,394 B1 * | 2/2002 | Brock | ................... G06F 11/302 709/249 |
| 6,486,883 B1 | 11/2002 | Mathur | |
| 6,658,652 B1 * | 12/2003 | Alexander, III | ...... G06F 9/5016 717/128 |
| 6,684,393 B1 * | 1/2004 | Loen | .................... G06F 9/45516 717/151 |
| 6,810,442 B1 | 10/2004 | Lin et al. | |
| 7,065,613 B1 * | 6/2006 | Flake et al. | .................... 711/132 |
| 7,209,248 B1 * | 4/2007 | Govindarajan | ........ G06F 9/5022 717/108 |
| 7,636,832 B2 * | 12/2009 | Raj | ...................... G06F 12/1081 711/207 |
| 8,190,807 B2 * | 5/2012 | Reid | ................... G06F 11/3636 717/136 |
| 2003/0135789 A1 * | 7/2003 | DeWitt, Jr. | ......... G06F 11/3466 714/38.13 |
| 2004/0261065 A1 * | 12/2004 | Abrams et al. | ............... 717/140 |

(Continued)

OTHER PUBLICATIONS

Goran Begic, "An Introduction to Runtime Analysis with Rational PurifyPlus", 2002, Rational Software.*

(Continued)

*Primary Examiner* — Wei Y Zhen
*Assistant Examiner* — Junchun Wu
(74) *Attorney, Agent, or Firm* — Cuenot, Forsythe & Kim, LLC

(57) ABSTRACT

A method of runtime analysis for a computer program can include generating runtime data relating to memory usage for an instrumented computer program and creating a memory map comprising a plurality of memory ranges of different types according to the runtime data. At least a portion of the memory map can be presented to indicate selected ones of the plurality of memory ranges.

15 Claims, 11 Drawing Sheets

(56) References Cited

U.S. PATENT DOCUMENTS

| | | | | |
|---|---|---|---|---|
| 2005/0102583 A1* | 5/2005 | Spadari | | 714/45 |
| 2005/0283770 A1* | 12/2005 | Karp et al. | | 717/151 |
| 2006/0005087 A1* | 1/2006 | Ristau | G01S 19/23 | 714/716 |
| 2006/0143534 A1* | 6/2006 | Dall | G06F 11/3636 | 714/38.11 |
| 2006/0294167 A1* | 12/2006 | Borman | G06F 12/0269 | |
| 2007/0136546 A1* | 6/2007 | Krauss | G06F 11/3409 | 711/170 |
| 2009/0217377 A1* | 8/2009 | Arbaugh | G06F 11/348 | 726/23 |

OTHER PUBLICATIONS

Jeff Campbell, "Memory profiling for C/C++ with IBM Rational Test RealTime and IBM Rational PurifyPlus RealTime", Jul. 2003, IBM.*

Garbervetsky et al. "Program Instrumentation and Run-Time Analysis of Scoped Memory in Java", 2004, Elsevier.*

Sulistio et al., "A taxonomy of computer-based simulations and its mapping to parallel and distributed systems simulation tools", Apr. 2004, SP&E (Year: 2004).*

Adam et al., "Robust Fragments-based Tracking using the Integral Histogram", 2006, IEEE (Year: 2006).*

Broom et al., "Small-scale field mapping of lichen distribution in three dimensions with a computer-based position-tracking system", Jan. 1999, Springer-Verlag (Year: 1999).*

Goodrum et al., "The application of active radio frequency identification technology for tool tracking on construction job sites", May 2005, Elsevier (Year: 2005).*

"Linear-to-Physical Memory Mapping by Bus Masters in Virtual Memory Systems", IBM Technical Disclosure Bulletin, vol. 34, No. 4A, pp. 355-357, Sep. 1991.

Krauss, "Range Tracking and Comparison Algorithms", Dr. Dobb's Journal, Feb. 2006.

* cited by examiner

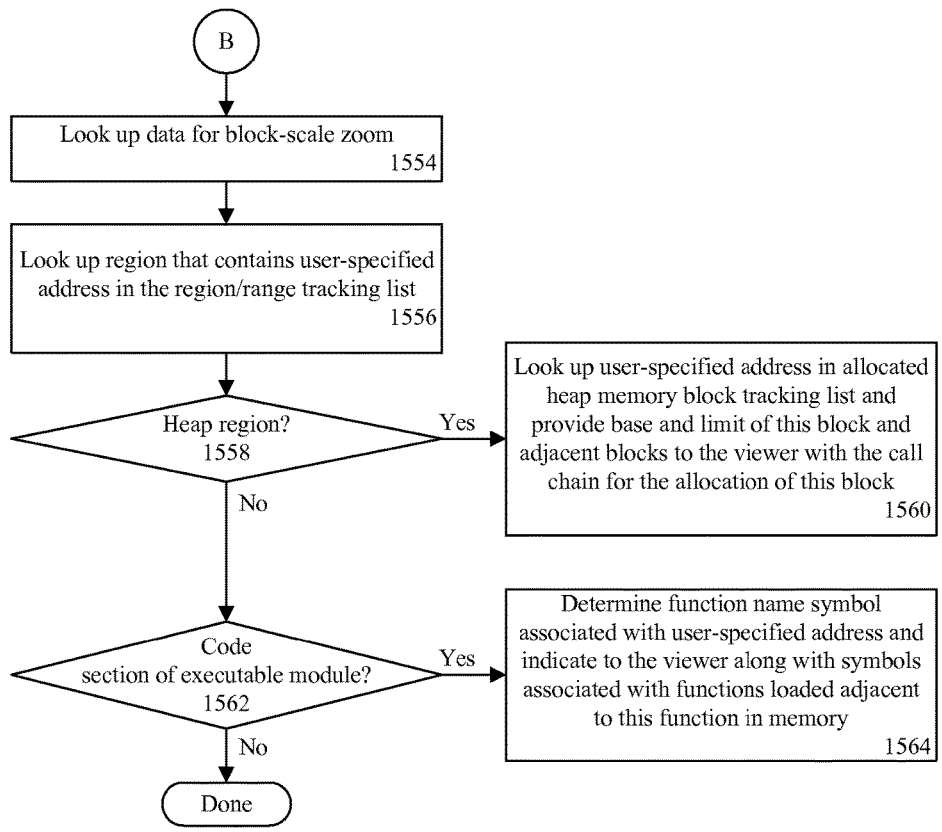
FIG. 15C
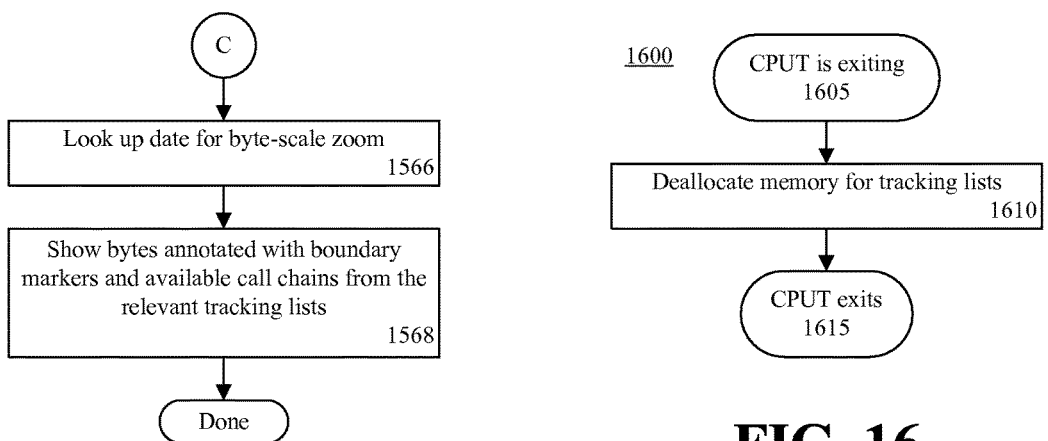
FIG. 15D
FIG. 16

USING MEMORY TRACKING DATA TO INFORM A MEMORY MAP TOOL

BACKGROUND OF THE INVENTION

Software analysis tools, such as debuggers, can provide valuable information relating to memory usage. This information helps to isolate errors within computer programs. While the information provided by debuggers no doubt is useful, there are limitations with respect to conventional debuggers and other software analysis tools.

One such limitation relates to the interface provided by most debuggers. Within a debug window, only a relatively small number of bytes of memory can be presented at one time. The amount of memory that can be shown is constrained by the size of the display window. Another limitation is that while a debugger may indicate which portions of memory have been committed for use, typically a debugger is unable to provide information relating to the size of the memory range that is committed. Still another limitation relates to the inability of a debugger to indicate subdivisions within memory ranges, e.g., smaller allocated memory regions within a larger memory range such as a heap.

Though the information noted above is not available in conventional software analysis tools, such information can be particularly useful in diagnosing errors within a computer program.

SUMMARY OF THE INVENTION

The present invention relates to a method of runtime analysis of a computer program. The method can include generating runtime data relating to memory usage for an instrumented computer program and creating a memory map comprising a plurality of memory ranges of different types according to the runtime data. At least a portion of the memory map can be presented to indicate selected ones of the plurality of memory ranges.

The present invention also relates to a method of runtime analysis for a computer program including generating runtime data relating to memory usage for an instrumented computer program, creating a memory map comprising a plurality of memory ranges of different types according to the runtime data, and presenting at least a portion of the memory map indicating at least one memory range from the plurality of memory ranges. An expanded view of the memory range(s) indicating one or more components within the memory range(s) can be presented.

The present invention also relates to a computer program product including a computer-usable medium having computer-usable program code that, when executed by an information processing system, performs the various steps and/or functions described herein.

BRIEF DESCRIPTION OF THE SEVERAL VIEWS OF THE DRAWINGS

FIGS. 15A-15D are flow charts illustrating a method in accordance with another aspect of the present invention.

FIG. 16 is a flow chart illustrating a method in accordance with another aspect of the present invention.

DETAILED DESCRIPTION OF THE INVENTION

Figure 1:
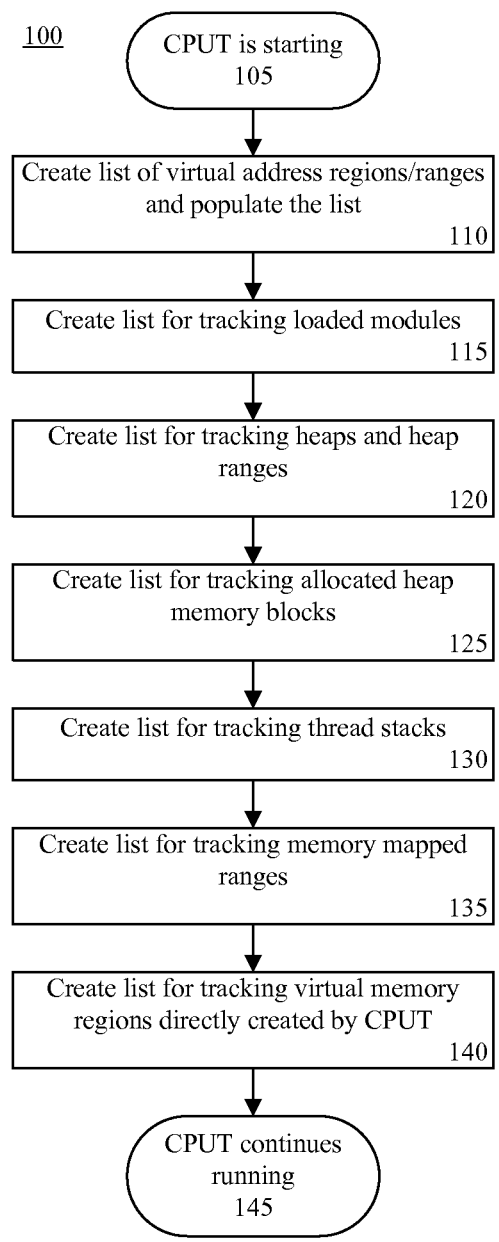
FIG. 1 is a flow chart illustrating a method in accordance with one aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to tracking memory usage during runtime of a computer program and using the information obtained to create a memory map. More particularly, a runtime analysis tool can be used to instrument a computer program. Runtime analysis code is inserted into the computer program, resulting in an instrumented computer program. As used herein, a "computer program under test" (CPUT), can refer to a computer program that has been instrumented with runtime analysis code. As the CPUT executes, the runtime analysis code inserted therein can track memory usage of the CPUT, for example, by intercepting calls that are associated with virtual memory management and storing details relating to the intercepted function calls.

Information obtained during execution of the CPUT can be used to generate a memory map which can be displayed by a viewer. The memory map can be "zoomable" in the sense that high level segments of memory ranges can be shown. The user is provided with the ability to zoom into those memory ranges to view and/or obtain additional information about the various components, or constituent parts, which comprise the higher level memory ranges. Multiple levels of zooming can be provided as will be discussed herein in greater detail.

The embodiments disclosed herein can be implemented using a runtime analysis tool. One example of a runtime analysis tool that can be used to implement the various functions described herein is Rational® PurifyPlus™ from International Business Machines Corporation of Armonk, N.Y., (IBM®). Rational® PurifyPlus™ is an example of a runtime analysis tool capable of instrumenting code and functioning cooperatively with the instrumented computer program during execution. (IBM, Rational, and PurifyPlus are trademarks of International Business Machines Corporation in the United States, other countries, or both).

In one embodiment, the CPUT can execute in conjunction with the runtime analysis tool such that the two function cooperatively to perform the various functions described herein in conjunction with a viewer. In another embodiment, the CPUT can execute independently, without the runtime analysis tool running concurrently, but in conjunction with the viewer. In either case, for ease of reference, it can be said that the runtime analysis tool or the CPUT "performs" the various steps described herein, whether or not the runtime analysis tool is executing concurrently with the CPUT.

FIGS. 1-16 illustrate various aspects relating to the tracking of memory usage during runtime of a computer program and using the information obtained to create a memory map. More particularly, FIGS. 1-16 illustrate aspects of the present invention relating to data collection for generating the memory map disclosed herein. The methods can begin in a state in which the computer program has been instrumented with runtime analysis code. The CPUT, with the runtime analysis code inserted therein, can track memory usage during execution.

FIG. 1 is a flow chart illustrating a method 100 in accordance with one aspect of the present invention. The method 100 can begin in step 105 where the CPUT begins execution. In step 110, a region/range tracking list of virtual address regions and/or ranges can be created and populated. The list can be populated by probing through the address space using any of a variety of known routine(s) suited to identifying different types of virtual memory ranges. For example, any of a variety of application programming interfaces (APIs) as may be provided by an operating system for obtaining information regarding virtual memory ranges can be used to construct the region/range tracking list. The different identifiable virtual memory types can include, but are not limited to, heap, stack, memory mapped, module, created via an API, reserved, free, unknown, etc. Address ranges can be specified in terms of the base address and a limit, which can be expressed as the next "higher" region minus 1.

The region/range tracking list can function as a master list. Information can be stored regarding different virtual memory ranges and/or virtual memory regions as the case may be. In cases where more detailed information regarding a portion of virtual memory is needed, such information can be stored in one or more of the tracking tables to be described herein. For example, a pointer can be stored within the region/range tracking list that points to one or more other tracking tables that store more detailed information, for example, at a lower level, or granularity, than is stored in the region/range tracking list.

In step 115, a module tracking list for tracking loaded modules can be created. Initially, the module tracking list can be empty until such time that one or more modules of the CPUT are loaded. In step 120, a heap tracking list for tracking heaps and heap ranges can be created. In step 125, an allocated heap memory block tracking list for tracking allocated heap memory blocks can be created. In step 130, a thread stack tracking list for tracking thread stacks can be created. In step 135, a memory mapped tracking list for tracking memory mapped ranges can be created. In step 140, a virtual memory tracking list for tracking virtual memory ranges that are directly allocated by the CPUT can be created. In step 145, the CPUT can continue to execute or run.

Figure 2:
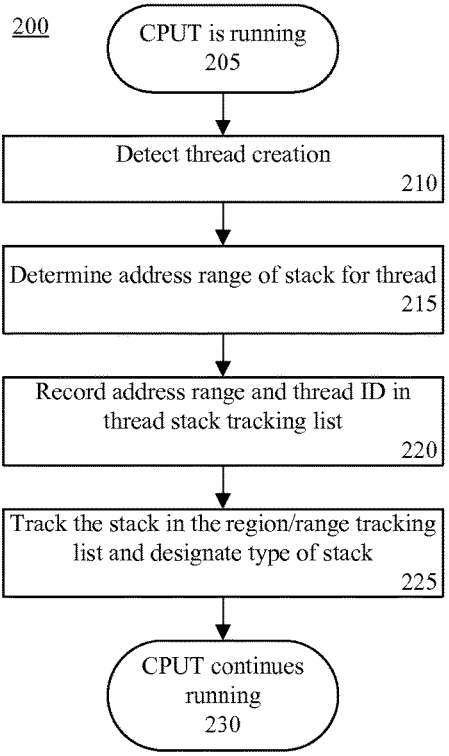
FIG. 2 is a flow chart illustrating a method in accordance with another aspect of the present invention.

FIG. 2 is a flow chart illustrating a method 200 in accordance with another aspect of the present invention. More particularly, method 200 illustrates the tracking of memory usage in relation to thread creation. Accordingly, in step 205, the CPUT can continue to run. In step 210, the creation of a thread can be detected. In step 215, the address range of the stack for the thread can be determined. In step 220, the address range and the thread ID of the thread that was created can be recorded as an entry in the thread stack tracking list. In step 225, the stack in the region/range tracking list can be tracked. That is, the region/range tracking list can be updated to reflect the address range of the stack of the thread and the state of that portion of virtual memory. A pointer to the entry for the thread stack in the thread stack tracking list can be stored in the region/range tracking list as well. The type of stack further can be designated, i.e., a thread stack. In step 230, the CPUT can continue to run.

Figure 3:
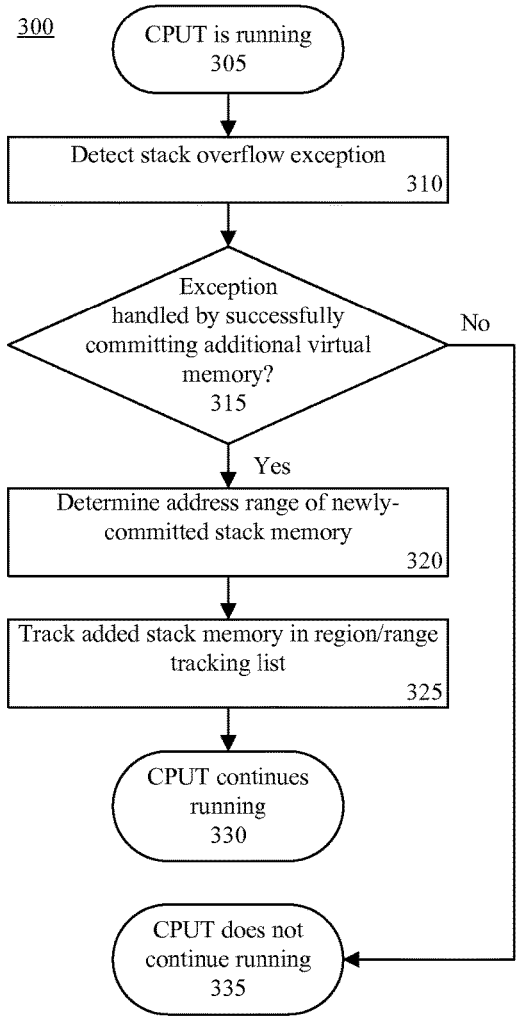
FIG. 3 is a flow chart illustrating a method in accordance with another aspect of the present invention.

FIG. 3 is a flow chart illustrating a method 300 in accordance with another aspect of the present invention. More particularly, method 300 illustrates the tracking of memory usage in relation to stack overflow exceptions. In step 305, the CPUT can be running. In step 310, a stack overflow exception can be detected. In step 315, a determination can be made as to whether the exception was handled successfully by committing additional virtual memory. If so, the method can proceed to step 320. If not, the method can continue to step 335, where the CPUT can discontinue execution.

In step 320, where the exception was handled successfully through the commitment of additional virtual memory, the address range of the newly-committed stack memory can be determined. In step 325, the added stack memory can be tracked within the region/range tracking list. That is, the region/range tracking list can be updated to indicate that the address range has been committed. In step 330, the CPUT can continue running.

Figure 4:
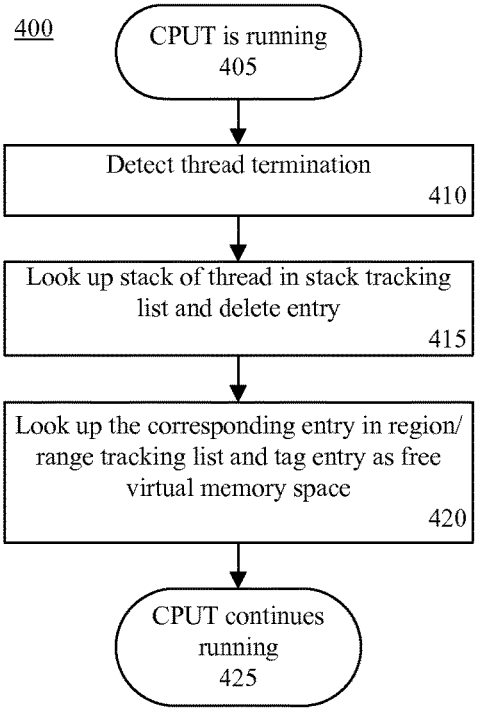
FIG. 4 is a flow chart illustrating a method in accordance with another aspect of the present invention.

FIG. 4 is a flow chart illustrating a method 400 in accordance with another aspect of the present invention. The method 400 illustrates the tracking of memory usage in relation to the termination of threads. In step 405, the CPUT can be running. In step 410, the termination of a thread can be detected. In step 415, the stack of the thread can be looked up in the thread stack tracking list. The entry corresponding to the stack of the terminated thread can be deleted or purged from the thread stack tracking list. In step 420, the corresponding entry in the region/range tracking list can be located or looked up. The corresponding entry within the region/range tracking list can be tagged or otherwise marked as free virtual memory space. In step 425, the CPUT can continue to execute.

Within modern operating systems, virtual memory can exist in several different states. By way of example, "free" virtual memory refers to virtual memory, e.g., a page, which is not committed or reserved. As such, free virtual memory is not available for a process of a computer program until allocated to the computer program or process in some fashion. As used herein, the term "allocated" can refer to reserving virtual memory, committing virtual memory, or both reserving and committing virtual memory.

Figure 5:
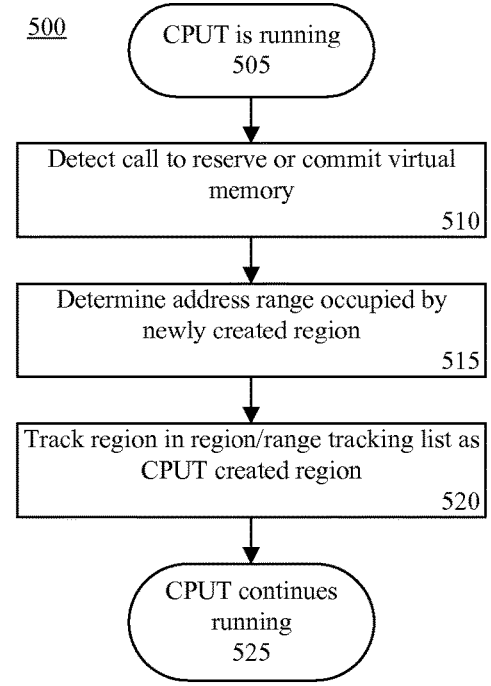
FIG. 5 is a flow chart illustrating a method in accordance with another aspect of the present invention.

FIG. 5 is a flow chart illustrating a method 500 in accordance with another aspect of the present invention. The method 500 illustrates the tracking of memory usage in relation to the reservation or commitment of virtual memory. In step 505, the CPUT can be executing. In step 510, a call to reserve or commit virtual memory can be detected. For example, within a Windows® type of operating system, a call to the "VirtualAlloc" API can be detected. In step 515, the address range occupied by the newly created region can be determined. In step 520, the region in the region/range tracking list can be tracked, or tagged, as a CPUT created region. In step 525, the CPUT can continue to run.

Figure 6:
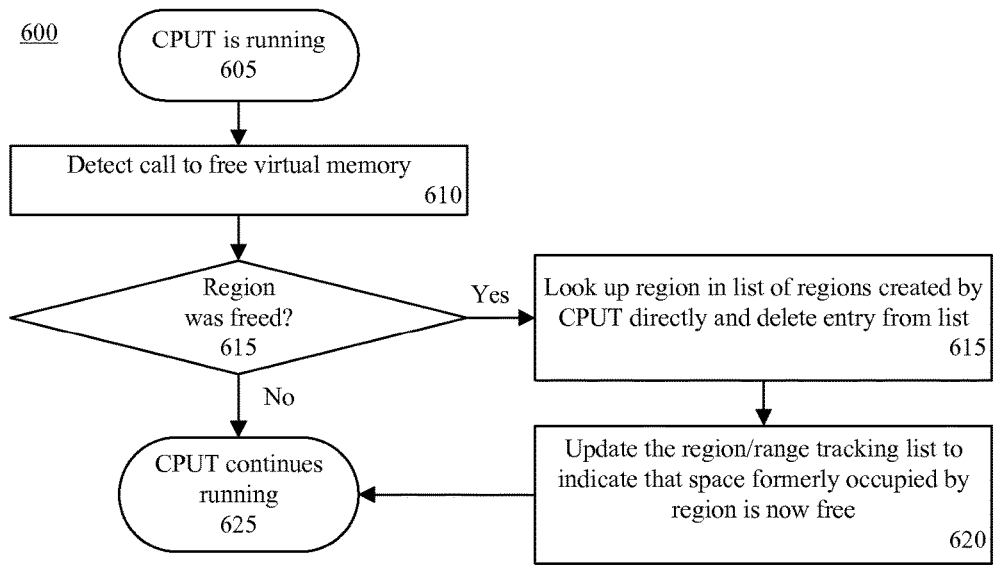
FIG. 6 is a flow chart illustrating a method in accordance with another aspect of the present invention.

FIG. 6 is a flow chart illustrating a method 600 in accordance with another aspect of the present invention. The method 600 illustrates the tracking of memory usage in relation to the use of virtual memory. In step 605, the CPUT can be executing. In step 610, a call to free virtual memory can be detected. For example, within a Windows® type of operating system, a call to the "VirtualFree" API can be detected. In step 615, a determination can be made as to whether a region was freed responsive to the detected call to free virtual memory. If so, the method can proceed to step 615. If not, the method can continue to step 625. In step 615, the region in the list of regions created by the CPUT directly can be looked up or otherwise located. The entry can be deleted from the list of regions created directly by the CPUT. In step 620, the region/range tracking list can be updated to indicate that the space formerly occupied by the region is now free. In step 625, the CPUT can continue to run.

Figure 7:
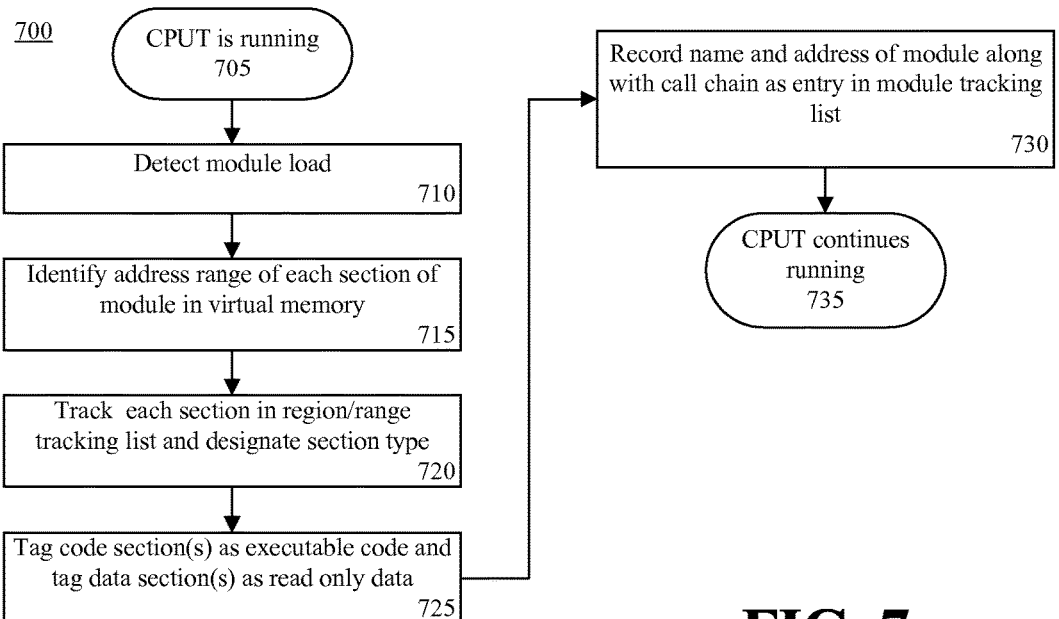
FIG. 7 is a flow chart illustrating a method in accordance with another aspect of the present invention.

FIG. 7 is a flow chart illustrating a method 700 in accordance with another aspect of the present invention. The method 700 illustrates the tracking of memory usage in relation to the loading of a module. In step 705, the CPUT can be running. In step 710, the loading of a module can be detected. In step 715, an address range for each section of the module in virtual memory can be identified. In step 720, each section in the region/range tracking list can be tracked. The region/range tracking list can be updated to indicate the address range for each section of the module as well as the section type, e.g., data or executable code. In step 725, the code sections can be tagged as "executable code" and the data sections can be tagged as "read only code". In step 730, the name and address of the module can be recorded as an entry in the module tracking list. The entry further can specify the call chain leading to the loading of the module. In step 735, the CPUT can continue to execute.

Figure 8:
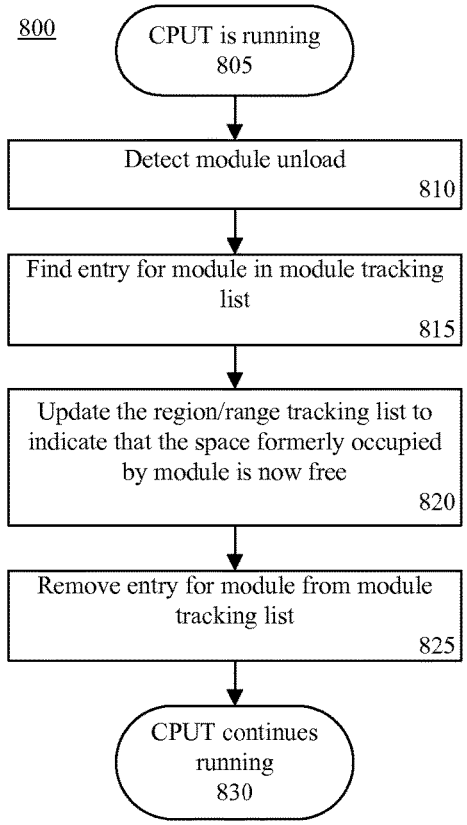
FIG. 8 is a flow chart illustrating a method in accordance with another aspect of the present invention.

FIG. 8 is a flow chart illustrating a method 800 in accordance with another aspect of the present invention. The method 800 illustrates the tracking of memory usage in relation to the unloading of a module. In step 805, the CPUT can be running. In step 810, the unloading of a module can be detected. In step 815, an entry for the module detected in step 810 can be located within the module tracking list. In step 820, the region/range tracking list can be updated to indicate that the space formerly occupied by the module is now free. In step 825, the entry corresponding to the module that was detected in step 810 can be removed from the module tracking list. In step 830, the CPUT can continue to execute.

Figure 9:
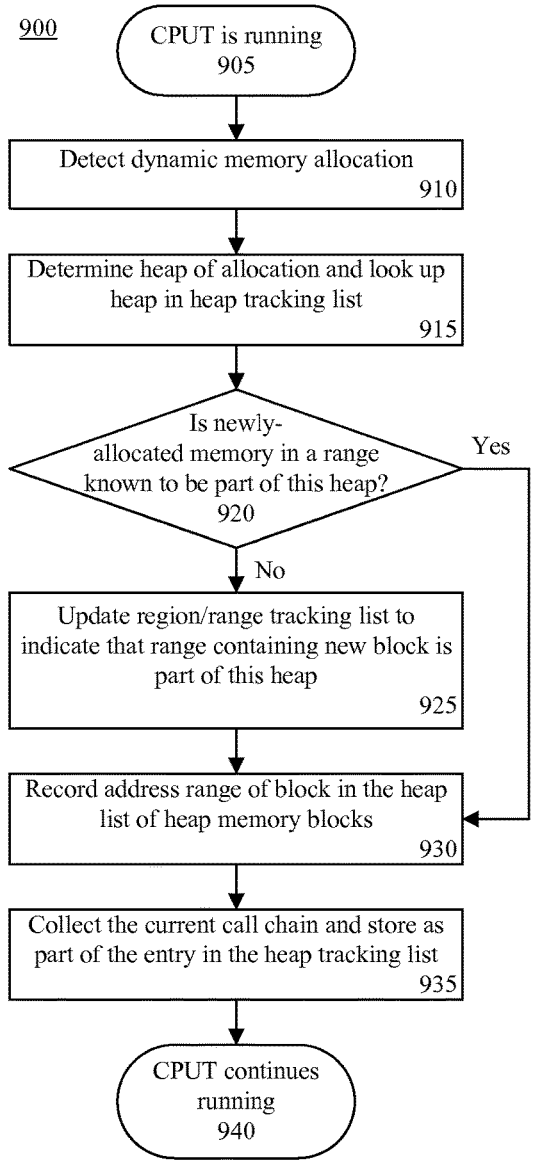
FIG. 9 is a flow chart illustrating a method in accordance with another aspect of the present invention.

FIG. 9 is a flow chart illustrating a method 900 in accordance with another aspect of the present invention. The method 900 illustrates the tracking of memory usage in relation to the detection of dynamic memory allocations. In step 905, the CPUT can be running. In step 910, a dynamic memory allocation can be detected. In step 915, the heap of the allocation can be determined and the heap in the heap tracking list can be looked up. In step 920, a determination can be made as to whether the newly-allocated memory is within a range that is known to be a part of this heap. Within particular operating systems, more than one heap may exist concurrently. In such cases, it becomes necessary to identify the heap within which the memory range is located, particularly as the heap can spread and shrink, e.g., additional memory can be reserved or uncommitted.

In one embodiment, a technique such as that described in "Range Tracking and Comparison Algorithms", *Dr. Dobb's Journal*, February 2006, which is fully incorporated herein by reference, can be employed. Still, it should be appreciated that other techniques can be used and the present invention is not intended to be limited to the use of any one particular technique. In any case, if the newly-allocated memory is within a range that is known to be a part of this heap, the method can proceed to step 930. If not, the method can continue to step 925.

Continuing with step 925, the region/range tracking list can be updated to indicate that the range containing the new block is part of this heap. In step 930, the address range of the block in the heap tracking list can be recorded. In step 935, the current call chain can be collected and stored as part of the entry. In step 940, the CPUT can continue to execute.

Figure 10:
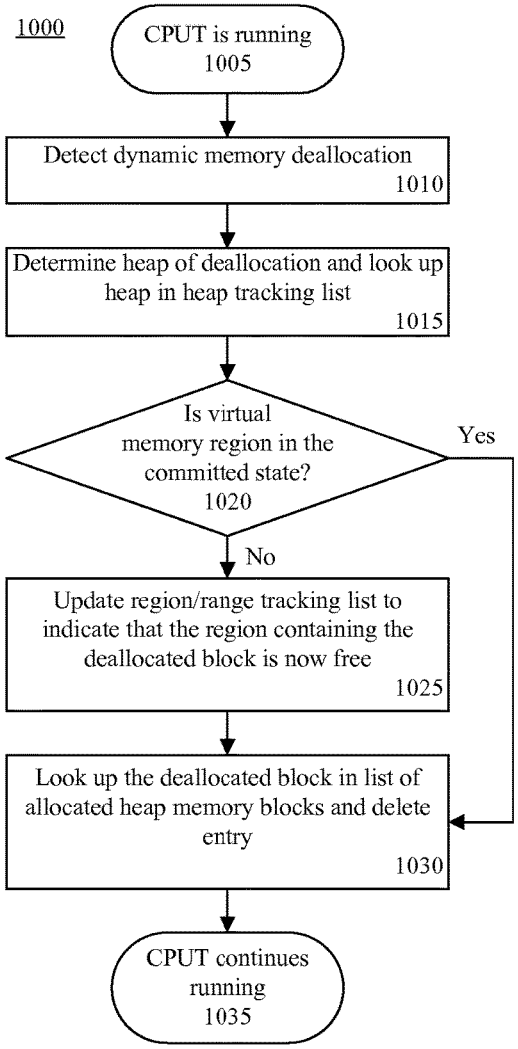
FIG. 10 is a flow chart illustrating a method in accordance with another aspect of the present invention.

FIG. 10 is a flow chart illustrating a method 1000 in accordance with another aspect of the present invention. The method 1000 illustrates the tracking of memory usage in relation to the detection of dynamic memory deallocations. In step 1005, the CPUT can be executing. In step 1010, a dynamic memory deallocation can be detected. In step 1015, the heap of the deallocation can be determined and looked up in the heap tracking list.

In step 1020, a determination can be made as to whether the virtual memory region is in the committed state. If so, the method can proceed to step 1030. If not, the method can proceed to step 1025. Committed virtual memory refers to virtual memory that has been reserved and associated with physical storage. Committed virtual memory is accessible to a computer program or process. The operating system typically loads committed pages of virtual memory into physical memory on demand, e.g., responsive to the first attempt to read or write to that virtual memory region. The function "VirtualFree", within a Windows® type operating system, can decommit a committed virtual memory region or can decommit and release a committed virtual memory region. Continuing with step 1025, the region/range tracking list can be updated to indicate that the region containing the deallocated block is now free. In step 1030, the deallocated block can be looked up in the allocated heap memory tracking list and the entry can be deleted. In step 1035, the CPUT can continue to execute.

Figure 11:
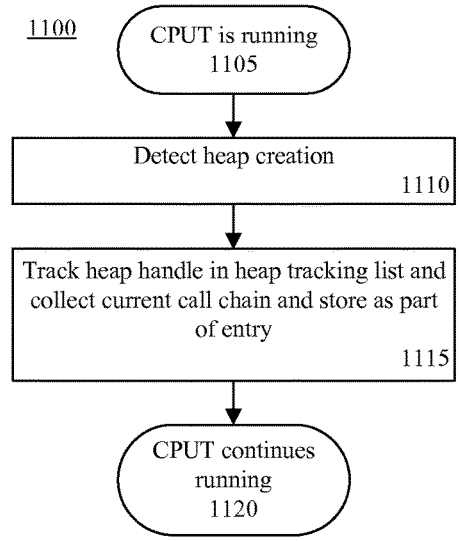
FIG. 11 is a flow chart illustrating a method in accordance with another aspect of the present invention.

FIG. 11 is a flow chart illustrating a method 1100 in accordance with another aspect of the present invention. The method 1100 illustrates the tracking of memory usage in relation to heap creation. In step 1105, the CPUT can be running. In step 1110, the creation of a heap can be detected. In step 1115, the heap handle can be entered or stored in the heap tracking list and can be tracked. The current call chain can be collected and stored as part of that entry. In step 1120, the CPUT can continue to run.

Figure 12:
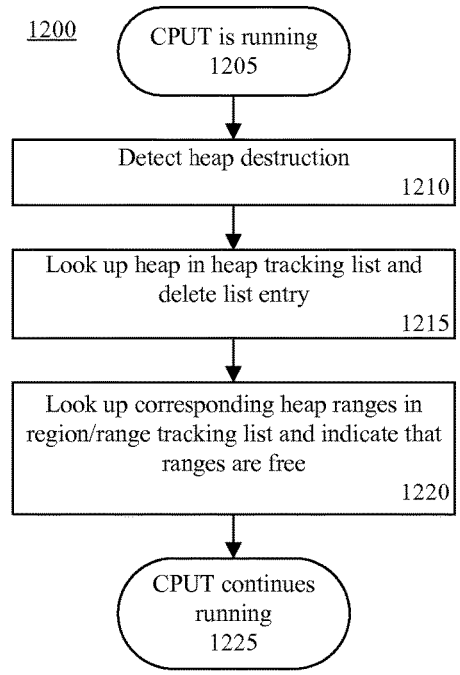
FIG. 12 is a flow chart illustrating a method in accordance with another aspect of the present invention.

FIG. 12 is a flow chart illustrating a method 1200 in accordance with another aspect of the present invention. The method 1200 illustrates the tracking of memory usage in relation to heap destruction. In step 1205, the CPUT can be executing. In step 1210, the destruction of a heap can be detected. In step 1215, the heap in the heap tracking list can be looked up and the entry can be deleted. In step 1220, the corresponding heap ranges in the region/range tracking list can be looked up and updated to indicate that the ranges are free.

Figure 13:
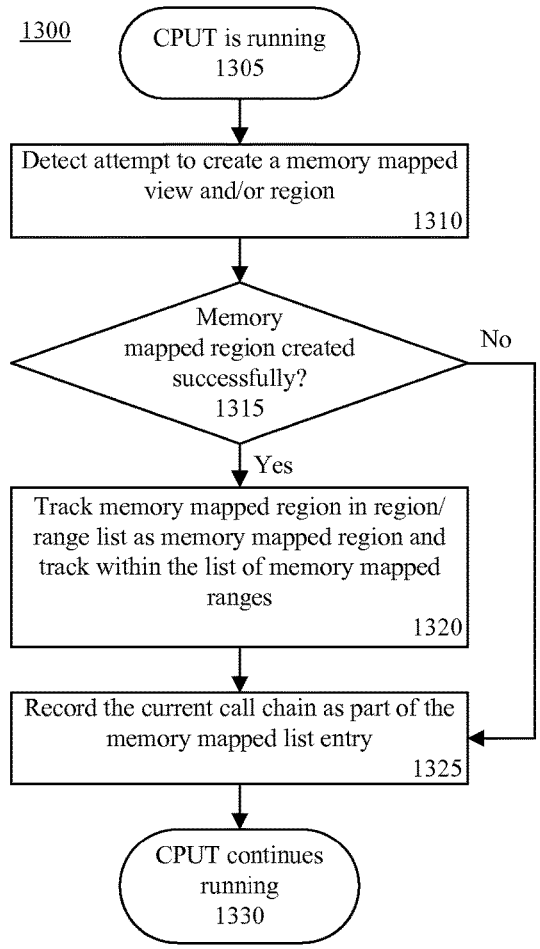
FIG. 13 is a flow chart illustrating a method in accordance with another aspect of the present invention.

FIG. 13 is a flow chart illustrating a method 1300 in accordance with another aspect of the present invention. The method 1300 illustrates the tracking of memory usage in relation to the creation of a memory mapped view and/or region, for example, in the context of memory mapped I/O. In step 1305, the CPUT can be running. In step 1310, an attempt to create a memory mapped view and/or region can be detected. In step 1315, a determination can be made as to whether the attempt detected in step 1310 was successful. If so, the method can proceed to step 1320. If not, the method can continue to step 1325.

Continuing with step 1320, the memory mapped region can be tracked in the region/range tracking list as a memory mapped region. The memory mapped region also can be tracked within the memory mapped tracking list. In step 1325, the current call chain can be recorded as part of the memory mapped tracking list entry. In step 1330, the CPUT can continue to execute.

Figure 14:
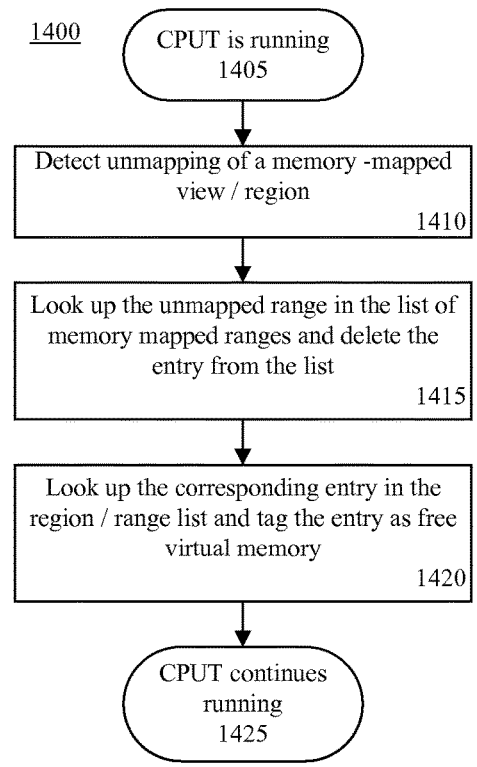
FIG. 14 is a flow chart illustrating a method in accordance with another aspect of the present invention.

FIG. 14 is a flow chart illustrating a method 1400 in accordance with another aspect of the present invention. The method 1400 illustrates the tracking of memory usage in relation to the un-mapping of a memory-mapped view and/or region. In step 1405, the CPUT can be running. In step 1410, the un-mapping of a memory-mapped view and/or region can be detected. In step 1415, the unmapped range can be looked up from the list of memory mapped ranges and the entry can be deleted from the memory mapped tracking list. In step 1420, the corresponding range in the region/range tracking list can be looked up and tagged as free virtual memory.

It should be appreciated that the call chain can be tracked and recorded for the various entries and lists noted herein, whether explicitly stated or not. As such, call chain information can be available at any of a variety of different "zoom" levels within the memory map when presented. Further, any of the information noted herein with respect to a tracking list can be displayed at one or more zoom levels of the memory map to be described herein.

Figure 15A:
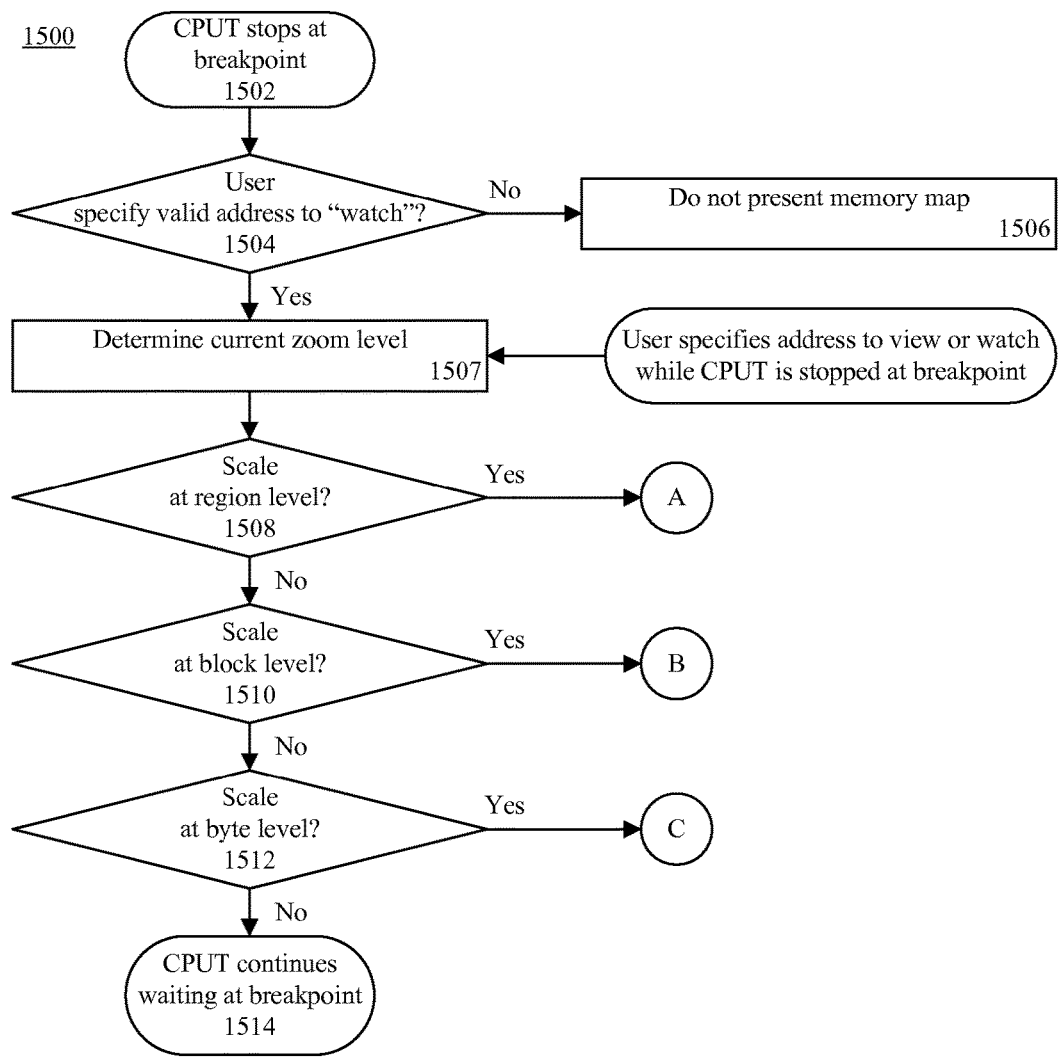

FIGS. 15A-15D are flow charts illustrating a method 1500 in accordance with another aspect of the present invention. The method 1500 illustrates one manner of presenting a memory map based upon the information collected during the execution of a CPUT as described herein. In FIG. 15A, in step 1502, the CPUT can stop at a breakpoint. In one embodiment, the breakpoint exception can be intercepted and analysis code, including viewer code for presenting the memory map as disclosed herein, can be run in an exception handling routine. In that case, the state of the CPUT can be returned to what existed prior to the occurrence of the breakpoint exception. In another embodiment, the tracking data can be stored in shared memory and a viewer module or program can access the data to perform the various steps described herein with respect to presentation of the memory map.

In step 1504, a determination can be made as to whether a valid address was specified to "watch". If so, the method can continue to step 1507. If not, the method can proceed to step 1506 where the memory map is not presented and no further action need be taken. In step 1507, the current zoom level can be determined. In one aspect, the zoom level can be determined from the address or address range specified by the user as the CPUT is stopped at the breakpoint. This determination can be made automatically, for example, by determining the lowest level tracking list having information for the indicated address, the highest level tracking list (e.g., the region/range tracking list), or a mid-level tracking list. In another aspect, the determination of the current zoom level can be made according to a user input that explicitly indicates the zoom level. In that case, the zoom level can be indicated in addition to any user-specified address to view or watch.

In step 1508, a determination can be made as to whether the scale of the memory map to be presented is the region level. If so, the method can proceed to step 1516 in FIG. 15B. If not, the method can continue to step 1510. In step 1510, a determination can be made as to whether the scale of the memory map to be presented is at the block level. If so, the method can proceed to step 1554 in FIG. 15C. If not, the method can continue to step 1512. In step 1512, a determination can be made as to whether the scale of the memory map to be presented is at the byte level. If so, the method can continue to step 1566 in FIG. 15D. If not, the method can proceed to step 1514 where the CPUT can continue to wait at the breakpoint.

Figure 15B:
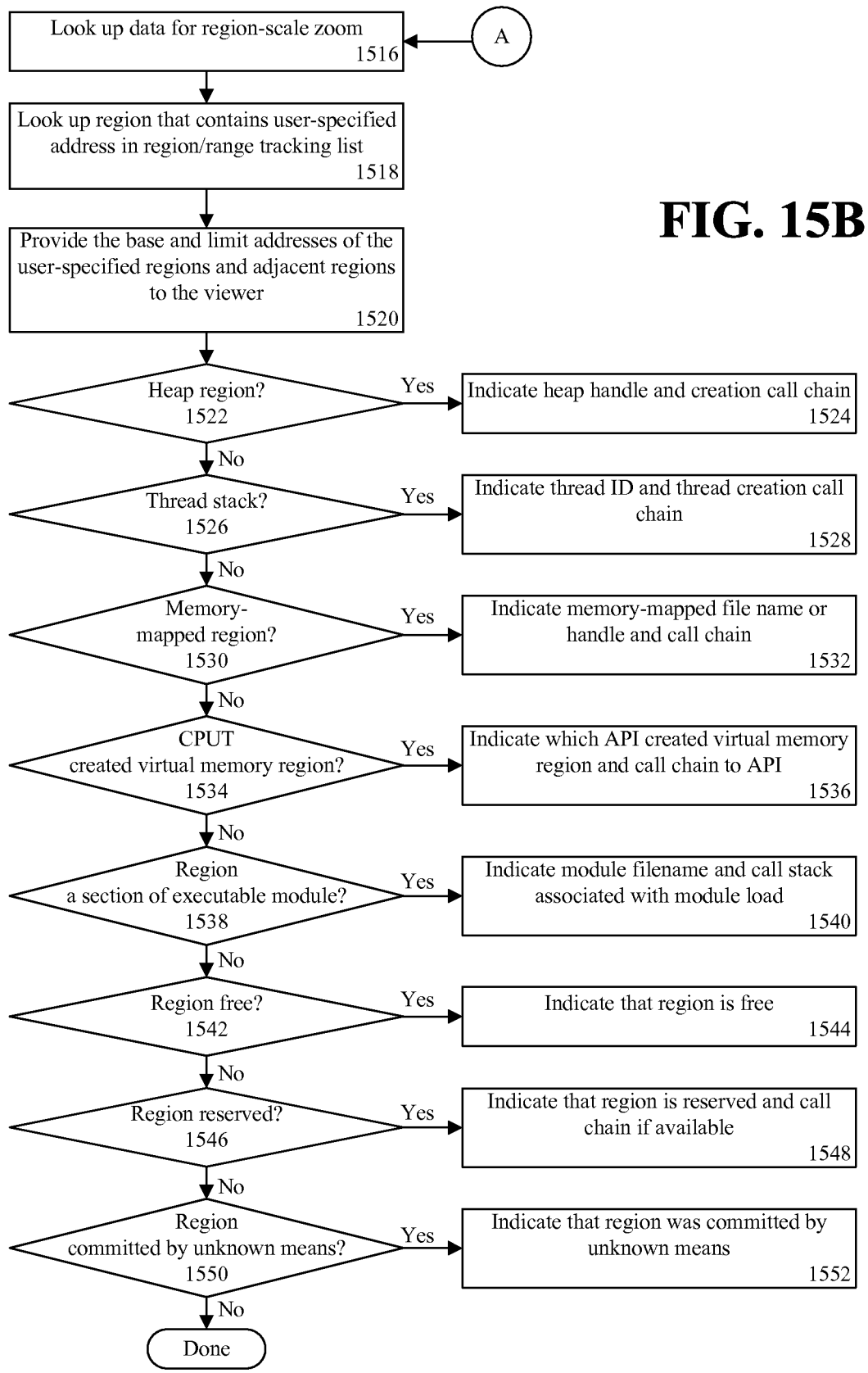

Continuing with step 1516 in FIG. 15B, where the scale is at the region level, the data for the region-scale zoom can be looked up. That is, since the scale is at the region level, any tracking lists specifying information for regions can be consulted. Any pointers within such region level tracking lists to more detailed, or lower level, tracking lists need not be followed at this point as the information specified within such lower level tracking lists is not viewable on the memory map to be presented. Accordingly, for a given scale, or zoom, of the memory map, only those tracking lists that contain relevant or viewable information for that particular scale need be accessed for information relating to a particular address and any adjacent portions of memory. In step 1518, the region that contains the user-specified address in the region/range tracking list can be looked up. In step 1520, the base and limit address of the user-specified regions and the adjacent regions can be provided to the viewer.

In step 1522, a determination can be made as to whether the region is a heap region. If so, the method can proceed to step 1524 where the heap handle and heap creation call chain can be indicated in the memory map. If not, the method can continue to step 1526.

In step 1526, a determination can be made as to whether the user-specified region is a thread stack. If so, the method can continue to step 1528 where the thread ID and thread creation call chain can be indicated on the memory map. If not, the method can continue to step 1530.

In step 1530, a determination can be made as to whether the user-specified region is a memory-mapped region. If so, the method can continue to step 1532, where the memory-mapped file name or handle and call chain can be indicated on the memory map. If not, the method can continue to step 1534.

In step 1534, a determination can be made as to whether the user-specified region is a CPUT created virtual memory region. If so, the method can proceed to step 1536, where the API that created the virtual memory region and the call chain to the API can be indicated on the memory map. If not, the method can proceed to step 1538.

In step 1538, a determination can be made as to whether the user-specified region is a section of an executable module. If so, the method can proceed to step 1540, where the filename and call stack leading to the loading of the module can be indicated on the memory map. If not, the method can proceed to step 1542.

In step 1542, a determination can be made as to whether the user-specified region is free. If so, the method can proceed to step 1544, where an indication that the region is free can be presented on the memory map. If not, the method can continue to step 1546.

In step 1546, a determination can be made as to whether the user-specified region is reserved. If so, the method can proceed to step 1548, where an indication that the region is reserved can be presented on the memory map along with the call chain, if available. If not, the method can continue to step 1550.

"Reserved" virtual memory can refer to a portion of virtual memory, i.e., a range of addresses referred to as a virtual memory region, which cannot be used by other allocation functions of an operating system. Typically, reserved virtual memory is not available for use by other components of the same program that are running under the same process. The virtual memory region, however, is not yet accessible to the computer program for which the reserved virtual memory was reserved until the reserved virtual memory region is associated with physical storage, i.e., committed.

In step 1550, a determination can be made as to whether the user-specified region was committed by unknown means. If so, the method can proceed to step 1552, where an indication that the region was committed by unknown means can be provided. If not, the method can end.

Continuing with step 1554 of FIG. 15C, where the scale of the memory map to be presented is at the block-level, the data for the block scale zoom can be looked up. In step 1556, the region that contains the user-specified address in the region/range tracking list can be looked up. In step 1558, if the region is a heap region, the method can proceed to step 1560. If not, the method can proceed to step 1562.

In step 1560, the user-specified address can be looked up in the allocated heap memory block tracking list. The base address and the limit of the block, as well as adjacent blocks, can be provided to the viewer along with call chain information relating to the allocation of the block.

In step 1562, a determination can be made as to whether the region is a code section of an executable module. If so, the method can continue to step 1564. If not, the method can end. In step 1564, the function name symbol associated with the user-specified address can be determined and provided to the viewer along with any symbols associated with functions loaded adjacent to the function in memory.

Proceeding to step 1566 in FIG. 15D, where the scale of the memory map to be presented is at the byte level, the data for byte-scale zoom can be looked up. In step 1568, the bytes can be shown with annotations of boundary markers as well as available call chains from the relevant tracking lists as discussed herein.

FIG. 16 is a flow chart illustrating a method 1600 in accordance with another aspect of the present invention. The method 1600 relates to deallocating memory for the CPUT. In step 1605, the CPUT can begin to exit. In step 1610, the memory used for the various tracking lists disclosed herein can be deallocated. In step 1615, the CPUT can exit.

The various methods described herein have been provided for purposes of illustration and are not intended to limit the present invention. Those familiar with runtime analysis tools, such as Rational® PurifyPlus™, for example, will appreciate that any of a variety of functions that relate to memory management can be intercepted and logged in addition or in lieu of those described herein.

The data collected during runtime can be used to update a memory map that visually indicates memory usage of the CPUT during execution. The memory map can be updated dynamically as the CPUT continues to execute according to entries in the list of existing memory ranges and/or the intercepted function calls. In one embodiment, the data collected during runtime can be stored without loss. That is, any data that is recorded can be preserved or maintained for the duration of any analysis being performed. In another embodiment, a lossy tracking scheme can be employed. One example of a lossy tracking scheme can be where least recently used data is deleted. Such data can be deleted after not being accessed or utilized after a predetermined amount of time.

A lossy tracking scheme for the data that is collected during runtime of the CPUT can reduce the amount of overhead imposed upon a computing system. In the case of a lossy tracking scheme, any data that is not viewed in, or otherwise accessed through, the memory map for a predetermined amount of time can be deleted. Such an embodiment assumes that any data of interest will be viewed by the user in the memory map and any data not viewed by the user within the memory map for a predetermined amount of time can be purged.

Examples of events that can cause the memory map to be displayed can include, but are not limited to, the reception of a user request to display the memory map, the detection of a breakpoint, the detection of a "Purify" watchpoint, the occurrence or detection of an error in the CPUT by the runtime analysis tool, or the like. If such an event is detected, the memory map can be displayed.

Figure 17:
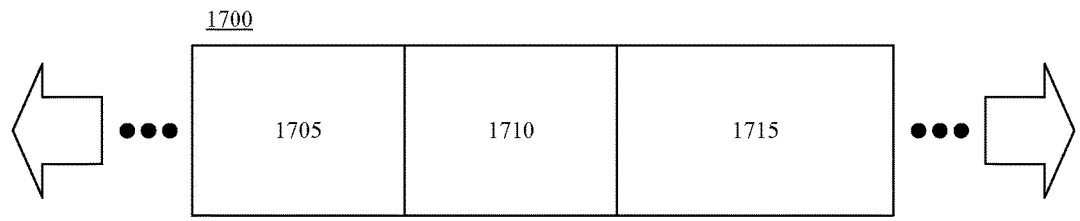
FIG. 17 is a view of a portion of a memory map in accordance with another aspect of the present invention.

FIG. 17 is a view of a portion of a memory map 1700 in accordance with another aspect of the present invention. The memory map 1700 can be presented responsive to any of a variety of different events as discussed. In one embodiment, the memory map 1700 can show contiguous portions of memory and visually indicate different characteristics relating to the memory ranges shown. It should be appreciated that a user can scroll the memory map in either direction to view further memory ranges to the left or to the right of the memory ranges 1705, 1710, and 1715 shown.

The three memory ranges 1705-1715 can be top level memory ranges. Each top level memory range can be associated with, or be classified as, any of a variety of different types. Possible types of top level memory regions can include, but are not limited to, a module, such as a DLL or other executable, a heap, or a stack, e.g., a thread stack. In one aspect, the user specified address can correspond to memory range 1710, such that adjacent memory ranges 1705 and 1715 also are presented.

The appearance of the memory map 1700 can be changed in response to one or more user inputs. Additional information can be presented responsive to further user inputs as well. For example, responsive to a user input, the memory map 1700 can be scrolled left or right. Responsive to other user inputs, for example a double click over one of the memory ranges 1705-1715, the memory map 1700 can be zoomed in to show the component parts of the selected memory range.

In one embodiment, when an event is detected that causes the memory map 1700 to be displayed, the memory map 1700 can be focused upon a memory range that was the subject of the event. In illustration, if a fault occurs relating to writing or reading from a particular memory range, the memory map 1700 can be presented and focused upon the memory range that was improperly accessed, e.g., memory range 1710. Memory range 1710, for example, can be highlighted or otherwise visually distinguished from the other memory ranges.

For example, when the CPUT accesses memory beyond the limits of a stack or heap range, a view of the memory map 1700 can be presented and focused upon the portion of memory that indicates the boundary between the memory range, i.e., the heap or stack, that was exceeded and neighboring memory range that was mistakenly accessed. The memory map 1700 further can be automatically zoomed to a level that shows the contents of the memory that was accessed.

Figure 18:
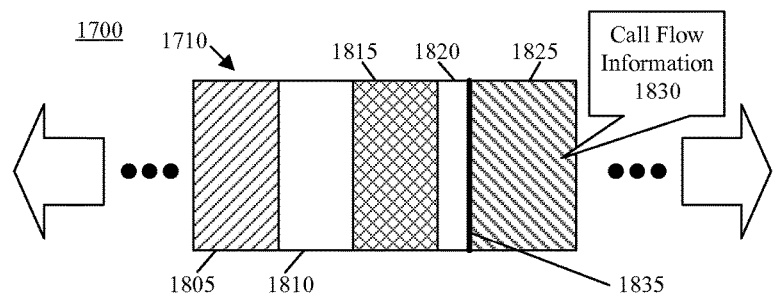
FIG. 18 is a view of a portion of the memory map in accordance with another aspect of the present invention.

FIG. 18 is a view of a portion of the memory map 1700 in accordance with another aspect of the present invention. More particularly, the portion of the memory map 1700 shown in FIG. 18 is an expanded view of the memory region 1710 of FIG. 17. The expanded view, or zoomed view, illustrates the constituent parts, or components, 1805-1825 of the memory range 1710.

For example, if the memory range 1710 is a module, the components 1805-1825 can include, but are not limited to, text, code, debug information, or any of the other distinctive parts that may exist within a module. If the memory range 1710 is a heap, the components 1805-1825 can include heap control blocks and allocated memory chunks, for example, as made available through a function such as "malloc". If the memory range 1710 is a stack, the contents of the stack can be shown, for instance, in terms of used and unused memory of the memory region occupied by the stack. In one aspect, distinguishing between used and unused memory can be performed by spraying the memory region with a predetermined bit pattern and determining which portions of the memory region still include that bit pattern, e.g., have not be overwritten.

As was the case with the portion of the memory map 1700 of FIG. 17, the portion of the memory map 1700 shown in FIG. 18 can be scrolled left, right, zoomed in, or zoomed out, for example, to the view shown in FIG. 17. In another embodiment, responsive to another user input, such as a right click over one of the components 1805-1825, call flow information 1830 indicating how the selected memory range was allocated can be presented. Call flow information, for example, can be presented within an information box or view located to the side of the memory map 1700 or can be presented within a "pop-up" style box or window.

The view illustrated in FIG. 18, for example, can be used to indicate heap fragmentation. When heap fragmentation occurs, a view that shows ranges of heap memory above the byte level can be useful in indicating which ranges of memory are occupied by the heap and how such ranges are utilized. Still, as will be illustrated, the memory map 1700 provides functions that will allow a user to zoom into the memory map 1700 further to view the heap, for example, at the byte level and observe the contents of those bytes.

Another aspect of the memory map 1700 can provide boundary information for the different memory ranges shown, despite the level at which the memory is depicted. That is, whether the memory ranges are higher level memory ranges as shown in FIG. 17, or are lower level memory ranges such as FIG. 18, or the byte level, addressing information can be indicated. In one embodiment, the beginning and end of each illustrated section of memory can be displayed. Thus, with reference to FIG. 18, the beginning and ending address of each of components 1805-1825 can be displayed. This information can be displayed directly upon the memory map 1700 or can be presented responsive to a user input, e.g., selecting or right-clicking a boundary between two components or memory ranges, i.e., boundary 1835. In any case, the boundary information can be visually indicated and exactly specified through the inclusion of address information. This can be particular useful where a memory range is comprised of a plurality of components that may or may not be contiguous.

Figure 19:
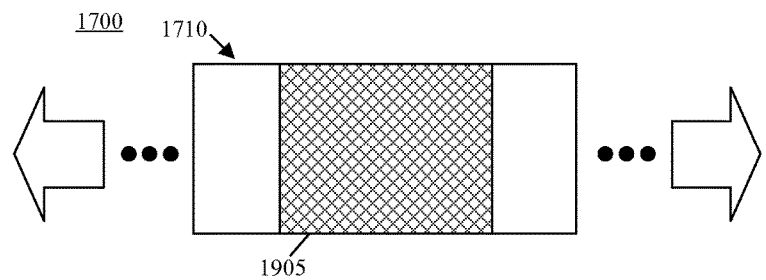
FIG. 19 is a view of a portion of the memory map in accordance with another aspect of the present invention.

FIG. 19 is a view of a portion of the memory map 1700 in accordance with another aspect of the present invention. More particularly, FIG. 19 illustrates a zoomed view of the memory range 1710. Within the memory range 1710, a data structure or other object 1905 can be shown or indicated. In this embodiment, it is assumed that the runtime analysis tool is capable of identifying when objects are created in memory and when such objects are destroyed. Any object, e.g. object 1905, that can be detected and/or tracked by the runtime analysis tool can be indicated within the memory range within which that object resides, at least when looking at the appropriate level of the memory map 1700.

Figure 20:
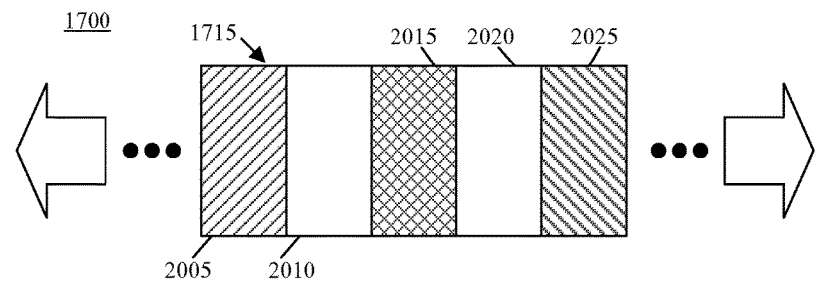
FIG. 20 is a view of a portion of the memory map in accordance with another aspect of the present invention.

FIG. 20 is a view of a portion of the memory map 1700 in accordance with another aspect of the present invention. FIG. 20 illustrates a zoomed view of a component of a memory range, such as component 1815, in which further details can be shown. More particularly, FIG. 20 illustrates the case in which individual bytes 2005-2025 of a portion of memory are shown. For example, the view shown in FIG. 20 can be presented responsive to a user input which requests further detail, or zooming, from the view presented in FIG. 18. The user can select component 1815 and zoom in on that component. When viewed at the byte level, the contents of each respective byte 2005-2025, e.g., the values stored in each byte, can be shown.

The view of FIG. 20 can be presented for a memory range despite the particular type of that range. That is, the memory map provides several different views of memory allowing the user to view memory usage from a high level as illustrated in FIG. 17, and continually drill down until the byte level is viewable as shown in FIG. 20. Thus, the byte level can be reached from zooming from the highest level (module, stack, heap), to the next level (blocks of the heap, text or DLL of a module), and then down to the byte level.

The memory map can be integrated with one or more debugging and analysis tools. In one embodiment, the memory map can be integrated or coupled with a debugger and function as the memory window. In that case, the zoom function can be provided and the user of the debugger can benefit from the added boundary information provided by the memory map.

In another embodiment, the memory map can be used in conjunction with a memory profiler. In that case, the memory map can be linked with the memory profiler such that when a user selects a particular object shown in a call graph, for example, the memory map can be configured to show the contents of the last object allocated by the particular call sequence indicated by the object's position in the call graph. The memory map can also show adjacent objects in memory, and/or adjacent unallocated space.

Those skilled in the art will recognize that any product names noted within this specification are intended to provide a basis for teaching one skilled in the art to better understand the embodiments disclosed herein. The mention of a particular product, however, is not intended to limit the present invention in any way. It further should be appreciated that any references within this specification to a particular operating system or a function of a particular operating system are made for purposes of illustration only and, as such, are not intended to limit the present invention to any one particular type of operating system. Those skilled in the art will recognize that the present invention can be implemented on, or extended to, any of a variety of different operating systems and that the particular functions indicated will change from one operating system to another.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method for runtime analysis of an instrumented computer program, comprising:
   generating, for each of a plurality of separate memory regions used by the computer program during runtime, memory usage data associated with the computer program; and
   creating, automatically without user input from the memory usage data for each of the plurality of separate memory regions, a memory map;
   selecting a type of memory range to be at least one of a module, a heap, or a stack; and
   presenting at least a portion of the memory map, wherein
   the memory map includes, based upon the memory usage data, a plurality of memory ranges of different types.

2. The method of claim 1, further comprising:
   inserting, into the computer program, runtime analysis code; and
   intercepting, by the runtime analysis code, calls to memory management functions during execution of the computer program.

3. The method of claim 1, further comprising:
   presenting, for a selected portion of memory from the memory map, call flow information, wherein
   the call flow information indicates how the selected portion of memory was allocated.

4. The method of claim 1, further comprising:
   indicating a boundary between two consecutive memory ranges of different types.

5. The method of claim 1, further comprising:
   presenting, for a selected memory range, an expanded view indicating at least one component within the selected memory range.

6. A computer-implemented hardware system configured to perform runtime analysis of an instrumented computer program, comprising:
   at least one hardware processor, wherein the at least one hardware processor is configured to perform:
   generating, for each of a plurality of separate memory regions used by the computer program during runtime, memory usage data associated with the computer program; and
   creating, automatically without user input from the memory usage data for each of the plurality of separate memory regions, a memory map;
   selecting a type of memory range to be at least one of a module, a heap, or a stack; and
   presenting at least a portion of the memory map, wherein
   the memory map includes, based upon the memory usage data, a plurality of memory ranges of different types.

7. The system of claim 6, wherein the at least one hardware processor is further configured to perform:
   inserting, into the computer program, runtime analysis code; and
   intercepting, by the runtime analysis code, calls to memory management functions during execution of the computer program.

8. The system of claim 6, wherein the at least one hardware processor is further configured to perform:
   presenting, for a selected portion of memory from the memory map, call flow information, wherein
   the call flow information indicates how the selected portion of memory was allocated.

9. The system of claim 6, wherein the at least one hardware processor is further configured to perform:
   indicating a boundary between two consecutive memory ranges of different types.

10. The system of claim 6, wherein the at least one hardware processor is further configured to perform:
    presenting, for a selected memory range, an expanded view indicating at least one component within the selected memory range.

11. A computer program product, comprising:
    a computer usable storage device having stored therein computer-usable program code for performing runtime analysis of an instrumented computer program,
    the computer-usable program code, which when executed by a computer hardware system, causes the computer hardware system to perform:
    generating, for each of a plurality of separate memory regions used by the computer program during runtime, memory usage data associated with the computer program; and
    creating, automatically without user input from the memory usage data for each of the plurality of separate memory regions, a memory map;
    selecting a type of memory range to be at least one of a module, a heap, or a stack; and
    presenting at least a portion of the memory map, wherein
    the memory map includes, based upon the memory usage data, a plurality of memory ranges of different types, and
    the computer usable storage device does not consist of a transitory, propagating signal.

12. The computer program product of claim 11, wherein the computer-usable program code further causes the computer hardware system to perform:

inserting, into the computer program, runtime analysis code; and intercepting, by the runtime analysis code, calls to memory management functions during execution of the computer program.

13. The computer program product of claim 11, wherein the computer-usable program code further causes the computer hardware system to perform:

presenting, for a selected portion of memory from the memory map, call flow information, wherein the call flow information indicates how the selected portion of memory was allocated.

14. The computer program product of claim 11, wherein the computer-usable program code further causes the computer hardware system to perform:

indicating a boundary between two consecutive memory ranges of different types.

15. The computer program product of claim 11, wherein the computer-usable program code further causes the computer hardware system to perform:

presenting, for a selected memory range, an expanded view indicating at least one component within the selected memory range.

\* \* \* \* \*